Figure 1:
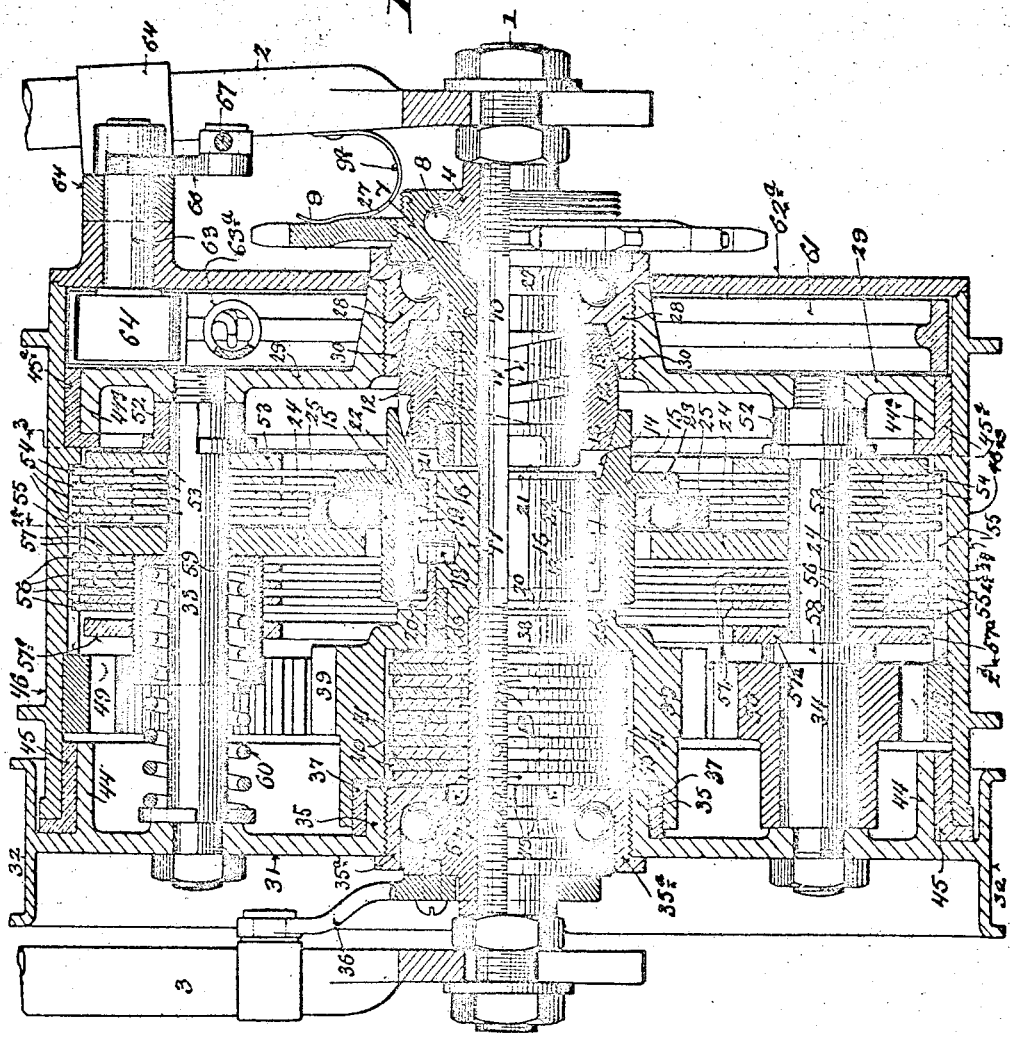

W. S. HARLEY.
VARIABLE SPEED GEARING.
APPLICATION FILED MAY 17, 1910.

978,880.

Patented Dec. 20, 1910.
4 SHEETS—SHEET 1.

Witnesses:
May Downey
Thos J. Ada Hunt

Inventor:
William S. Harley
By Oliphant Young
Attorneys.

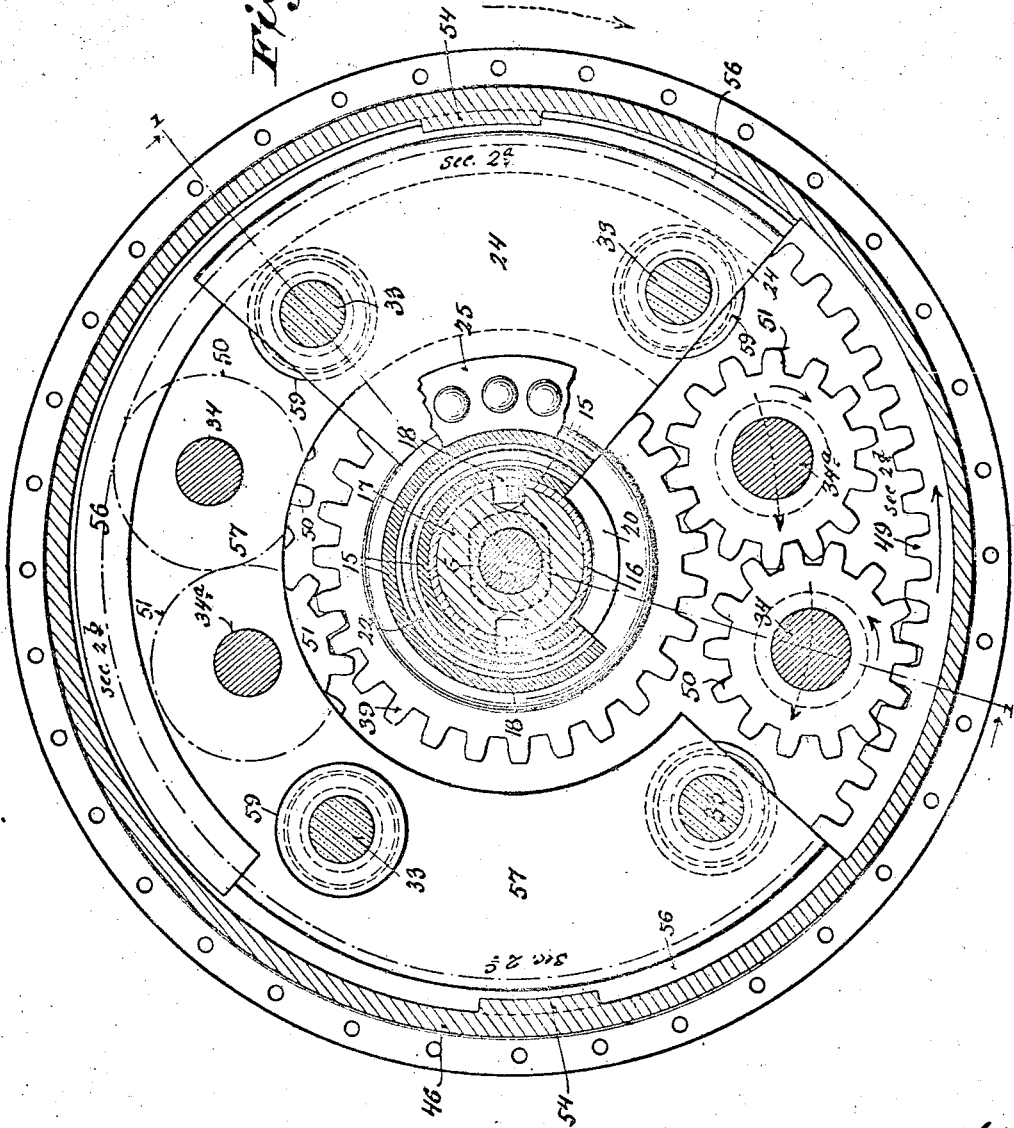

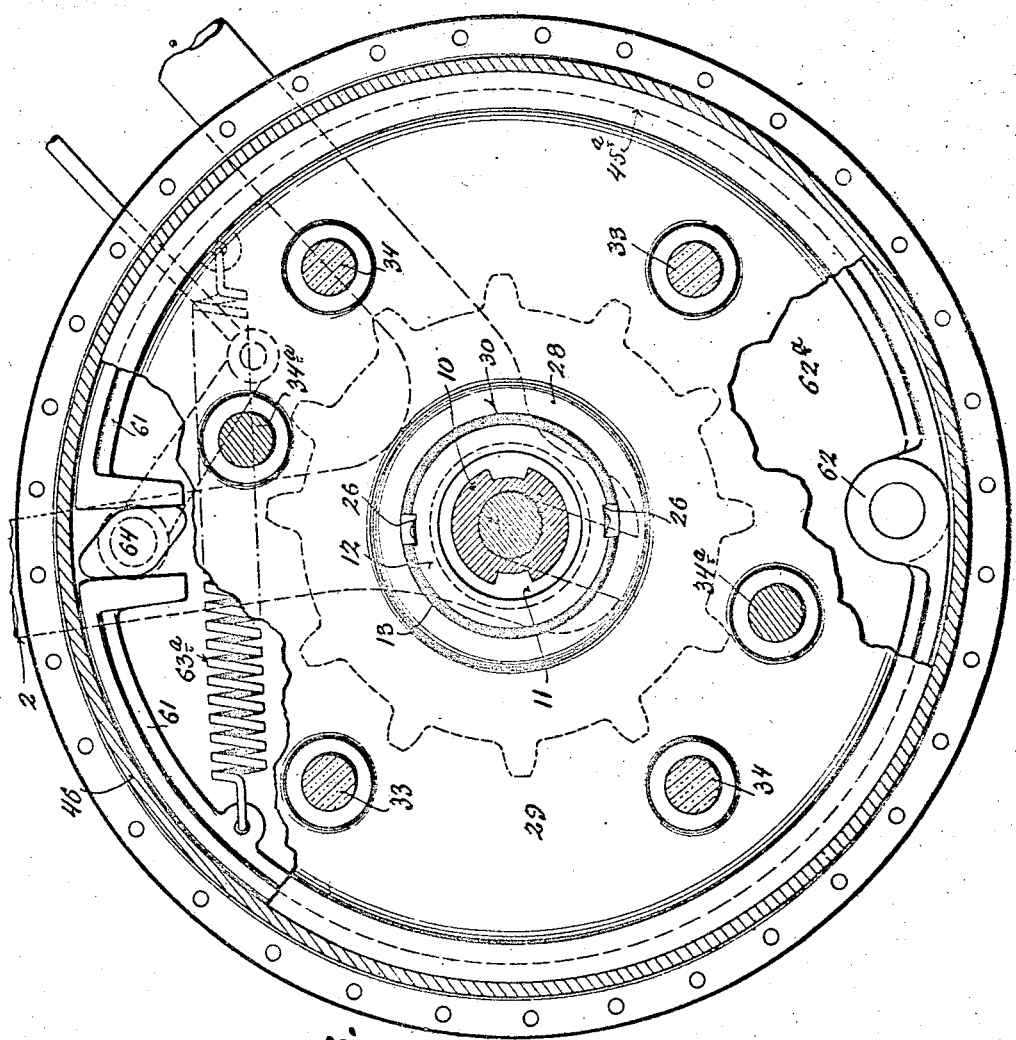

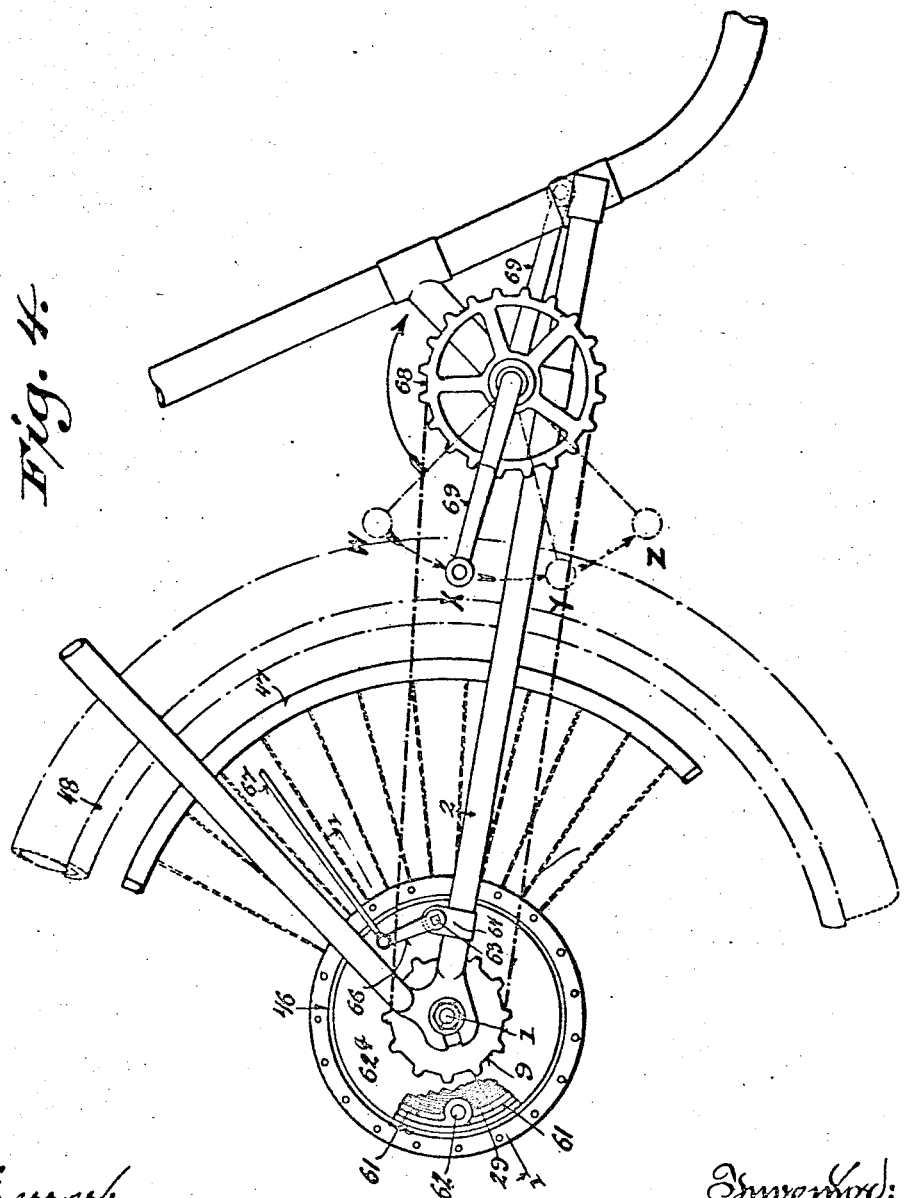

UNITED STATES PATENT OFFICE.

WILLIAM S. HARLEY, OF MILWAUKEE, WISCONSIN.

VARIABLE-SPEED GEARING.

978,880.  Specification of Letters Patent.  Patented Dec. 20, 1910.

Application filed May 17, 1910. Serial No. 561,792.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Variable-Speed Gearing; and I do hereby declare that the following is a full, clear, and exact description thereof.

The object of my invention is to provide a simple, effective and durable variable speed gearing in connection with drive and driven members, through the drive member of which engine-power is transmitted to the driven member at high or low speed, the gearing being also provided with a series of friction brake elements in connection therewith. Both the speed gearing and brake elements are under foot pedal control, which control is accomplished through a series of independent movements thereof, whereby the engine may be started by an initial forward pedal action, after which the engine-connected drive-member picks up the driven member in the usual manner. The second operation is accomplished through a slight back pedal movement that frees the engine, and a further backward motion of the pedals causes coupling of a back gear connection, whereby the drive member will impart low speed to the driven member, while still a further back movement of the pedals throws into clutch an emergency brake, whereby the engine and vehicle are stopped by the overload.

My invention as illustrated is applied to a motorcycle, the drive member in this instance being represented as the hub of a pulley which is loosely mounted upon the stationary axle of the rear or drive wheel, the pulley being arranged in belt connection with an explosive engine in the usual manner. The drive member in this instance is the hub of the rear wheel of the vehicle, which hub, like the hub of the pulley, is loosely mounted upon the axle and adapted to be connected or disconnected to the pulley hub by suitable pedal movements.

With the above objects in view the invention consists in certain peculiarities of construction and combination of parts as fully set forth hereinafter with reference to the accompanying drawings and subsequently claimed.

In the drawings Figure 1 represents a full size cross-section of a variable speed gearing mechanism embodying the features of my invention, with certain parts in full lines to more clearly illustrate the structural features, the section being indicated by line 1—1 of Figs. 2 and 4; Fig. 2, a sectional elevation of the same taken upon four different planes as indicated by lines $2^a$, $2^b$, $2^c$ and $2^d$ respectively of Fig. 1; Fig. 3, a sectional elevation with parts broken away as indicated by line 3—3 of Fig. 1, and Fig. 4, a side elevation of a portion of a motorcycle upon a reduced scale, embodying the features of my invention.

Referring by characters to the drawings, 1 represents a non-rotatory axle mounted in keeper-plates that extend from the rear forked tubes 2, 3, of a motorcycle frame. The axle is provided with adjustable cones 4, 5, upon opposite ends thereof, the cone 5 having a sleeve extension 6, the end of which has flattened faces as indicated by dotted lines in Fig. 2. A cup 7 is fitted over the cone 4, having interposed therebetween a series of ball bearings 8. This cup carries the usual sprocket-wheel 9 and has an inwardly extending sleeve 10, to which sleeve there is secured a threaded section 11, upon which is loosely mounted a nut 12 having tapered friction faces 13, $13^a$. The friction face 13 is adapted to engage an internal friction face 14 of a circular block 15, which block is loosely mounted upon a shell 16, that in turn is supported by head 17. The head 17 is fitted upon the axle and provided with an extension which overhangs and interlocks the flattened end of the cup sleeve 6, whereby said head is held against rotation. The shell 16 that is mounted upon the head is held against rotation thereon by means of pins 18, which extend from the head and project through slots in the shell, whereby said shell may be adjusted longitudinally with relation to the head. Block 15 is also capable of longitudinal movement upon the shell and is likewise held against rotation by means of the pins 18, that also extend into slots 19 of the block. Movement of said block upon the shell in a lateral direction is controlled by terminal flanges 20 and 21 of the shell, the block being normally held against the flange 21 by a coiled spring 22, which coiled spring is seated within an annular recess of the block 15 and adapted to exert pressure upon the shell flange 20, said spring being under an approximate normal pressure, for example, of fifty pounds. The circular head 15 is provided with a flange 23, which flange is designed to exert pressure upon a disk 24 through anti-friction balls interposed therebetween, which balls are seated within a retaining collar 25. The nut 12 carries one or more leaf springs 26, for engagement with the friction face 14 of the head, whereby a slight pressure is exerted upon said nut to hold the same against rotation when acted upon by the rotation of the nut in either direction. The cup 7 is also provided with an exterior ball-race 27 for a series of anti-friction balls that serve as a bearing for a cup-member 28, which member forms the hub of a rotatory bearing-head 29. The cup-member 28 is also provided with an internal friction face 30 that is adapted to engage the friction face $13^a$ of the nut. The bearing-head 29 is connected to the web portion 31 of a pulley-hub 32 by two series of tie-bolts, one series being indicated by the character 33, and the other series by the characters 34, $34^a$, the said web portion of the pulley being provided with an inturned threaded flange 35 for the reception of a cup $35^a$, between which cup and the cone 5 a series of anti-friction balls are interposed, which balls, in conjunction with the opposite series, form journals for the connected bearing-head 29 and pulley-hub.

The cone 5 is held against rotation upon the axle through an arm 36 that is suitably connected to the forked tube 3. A bearing ring 37 is fitted to the flange 35 of the pulley-hub and a similar bearing-ring 38 is fitted to the overhung extension of head 17 and upon these bearing-rings there is loosely mounted a toothed gear-wheel 39, the hub of which gear-wheel is recessed for the reception of a series of friction rings 40 that are rotatively held in connection with the gear-wheel through a feather 41, that projects into notches of said rings, this connection permitting free lateral movement thereof. A corresponding series of friction rings 42 are in spline connection with the sleeve 6 of cone 5, these rings being alternately interposed between the rings 40, whereby the gear-wheel may be frictionally locked against rotation, the first ring $42^a$ of the non-rotatory series being adapted to shoulder against lugs 43 of said sleeve, whereby end thrust of the rings is taken and thus the cup connection together with the pulley-hub is free to turn irrespective of the movement of the disks.

The pulley-hub 32 and bearing-head 29 are provided with inturned flanges 44, $44^a$, for the support of bearing-rings 45, $45^a$, upon which bearing-rings is loosely mounted a wheel-hub 46, it being understood that the pulley-hub and wheel-hub are each provided with spoke flanges, to which are secured by suitably arranged spoke-connection the usual pulley and spoke rims 47 and 48 respectively, as indicated in Fig. 4 of the drawings, the said pulley-hub and wheel-hub constituting drive and driven members of the speed clutch mechanism. The wheel-hub 46 carries an internal toothed gear-wheel 49, which meshes with oppositely disposed toothed pinions 50 that are journaled upon the tie-bolts 34. These pinions in turn mesh with a second set of pinions 51 that are journaled upon the tie-bolts $34^a$ and also mesh with the gear-wheel 39.

The disk 24, which, as previously stated, is adapted to be moved in one direction by the circular block 15, is apertured at intervals to permit the two series of tie-bolts to pass therethrough, the said disk being suspended and guided upon these bolts. Each bolt has fitted thereon adjacent to the bearing-head 29, a spacing-collar 52, against which collar the first of a series of friction rings 53 is fitted, the rings being slidably mounted upon the two series of tie-bolts, between the collar 52 and disk 24, which bolts pass through apertures therein.

The series of friction rings 54 which co-act with the friction rings 53 are alternately interposed between said friction rings 53, the latter series being arranged to rotate with the wheel-hub 46, by which they are supported and rotatively connected through feathers 55 that project from the interior wall of said wheel-hub. Similar alternate sets of friction rings 56 and 57 are arranged upon the opposite side of the disk 24, the series 56 being rotatively mounted with relation to the wheel-hub while the series 57, which is interlocked therewith, correspond to the previously mentioned series 53, being guided upon and rotatably mounted with the tie-bolts. The last ring $57^a$ of this series is shouldered against collars 58 of the tie-bolts 34, $34^a$, the said last ring being arranged to oppose the series when longitudinal movement is imparted thereto for producing a frictional lock. The friction ring $57^a$ and its series 57, are each provided with enlarged circular apertures through which thimbles 59 extend. The bottoms of these thimbles are adapted to engage the adjacent surface of the disk 24, the thimbles being mounted upon the tie-bolts 33, and seated within said thimbles are coiled springs 60, which springs surround said tie-rods, being interposed between the bottom of the aforesaid thimbles and shoulders of the flanged portion of the pulley-hub. A hand-controlled band-brake is also provided in connection with the wheel-hub, said mechanism being in the form of a two-part band 61, having a hinge connection 62, the band being adapted to engage the inner face of the wheel-hub exterior of the bearing-head 29. The sections of the band are held free of the hub surface by a coiled spring $63^a$ which is connected to the hinged members. The band-brake is inclosed by a non-rotatory dust cap 62ª, which is fitted to the end of the hub, the dust cap being provided with an apertured boss, through which a stud 63 extends. The stud is oscillatorily mounted in a fixed bearing-bracket 64, which bearing-bracket is secured to the adjacent forked tube 2. The inner end of the stud carries a shoe 65, that is arranged to oppose the opposite terminals of the band-brake sections, whereby said band-brake is set incidental to movement of the stud that is under hand control through a lever 66 secured thereto, which lever is provided with a connecting rod 67 that extends upward within reach of the rider.

The sprocket-wheel 9, as shown by Fig. 4, is in link-belt connection with a second sprocket-wheel 68 mounted in the usual manner upon the frame and provided with operating cranks 69 adapted to be rotated by foot power, it being understood that the cranks carry pedals not shown.

In the operation of my variable speed gear, if the cranks were propelled in a forward direction as indicated by the arrow in full lines, the sprocket-wheel 9 will move in the direction as indicated by the arrow in Fig. 1. This movement will cause the friction face 13ª of the nut to engage the friction face 30 of the bearing-head 29 and thus said bearing-head, being connected by the tie-bolts to the pulley-hub, will be locked and rotated with the sprocket 9 and its sleeve 10. The wheel-hub in this instance, will also be rotated with the pulley-hub due to the locking engagement effected by the coiled springs 60, which are now free to act upon the nest of friction rings indicated by the character A. This movement cranks the engine in the usual manner, which, after starting, imparts direct drive to the clutched members. Assuming that the operator will now stop pedaling and hold the cranks in the position as shown at W in dotted lines in Fig. 4, the cranks and sprocket-wheel 9 will cause the nut 12, which has been engaged with the friction face 30 of the head, to be rotated slightly upon the threaded section and thus automatically disengage or break its connection between said head and sprocket-sleeve 10. The wheel-hub and pulley-hub will now rotate together due to the spring-locked clutch connection A between the members. Should the operator desire to free his engine, it can be effected by a slight back pedal movement, which movement, for example, would place the cranks in the position shown in full lines as indicated by X. This will cause the parts to assume the position as shown in Fig. 1, the back pedal movement having caused the nut 12 to move toward the center of the hub for a distance sufficient to effect a clutching engagement between the friction faces 13 and 14 respectively of said nut and block 15. The movement is also sufficient to cause a slight lateral displacement of the block 15 in the same direction, carrying with it the shell 16. The said movement acts upon the disk 24, whereby the spring-locked clutch A of the wheel-hub is released. Thus the wheel-hub is disconnected from the pulley and the engine thereby freed.

The next operation would be for the purpose of throwing in the low speed, which operation is as follows: A further back pedal movement to the position as indicated by dotted lines in Fig. 4, marked Y, will cause the engaged nut and block to move in the same direction for a predetermined distance, but prior to this last movement the flange 20 of the shell has engaged the adjacent hub end of the gear-wheel 39 and consequently the instant said last named movement of the block takes place it permits the full force of the spring 22 to act through the flange 20 directly upon said gear-wheel. As previously stated, the intial pressure of the coiled spring is approximately fifty pounds and this pressure is sufficient to cause a locking engagement of the clutch mechanism as indicated at B, which mechanism comprises the friction rings 40 and 41 contained within the gear-wheel hub, whereby said gear-wheel is locked against rotation. The pulley-hub, being free to turn, as indicated by the arrow in Fig. 2, will cause rotation of the pinions 51 in the direction of the arrow, due to their travel about the now fixed gear-wheel 39. The pinions 51 transmit motion to the pinions 50 in the direction as indicated by the arrow, which motion is, in turn, transmitted to the internal gear 49, causing the same to rotate in a reversed direction from that of the pulley. This back gear connection will cause the wheel-hub to rotate in a forward direction at approximately half the speed of the pulley-hub, due to the fact that the pinions carried thereby are making two revolutions about the common axis, while they are imparting movement to the wheel-hub in a reversed direction at half the speed. The planetary gear movement when thus put into commission causes the machine to travel at half speed with a proportionate increase in power for effecting a drive connection when hill climbing, or power is needed in preference to speed.

The fourth back pedal movement, as indicated at Z, Fig. 4, is effected to accomplish an emergency brake operation, whereby the engine may be stopped by an overload. The last back pedal movement in the same direction as those previously described, will cause the block 15 to move still farther and compress the spring 22 contained therein, which spring permits this farther movement, while the shell 16 remains in the position previously assumed. In effecting this last movement the block 15, through the antifriction balls interposed, exerts pressure upon the disk 24 and causes the same to move over in opposition to the coiled springs 60 until the group of friction rings indicated by C have been locked together in opposition to the last ring 57ª of said series. Thus the wheel-hub, which had previously been rotating at half speed relative to the pulley hub, will be locked and the parts so locked will act as a brake upon the engine which had previously been imparting motion to the drive and driven member at different speeds.

It is understood that when the drive and driven member are locked together for high speed that there is no movement between the back gear connection of said parts, the same being rotated together while the gear-wheel 39 revolves loosely upon its bearing-rings 37 and 38 respectively, while in the case of emergency clutch operation whereby the engine is stopped, the result is obtained owing to the fact that the gear-wheel 39 is also locked against rotation and hence in the emergency brake operation all of the parts are locked through their several connections to the non-rotatory axle.

As shown in Fig. 1, the sprocket wheel 9 is preferably provided with a friction member 9ª, which member, in this instance, comprises a spring that is secured to the forked tube 2 and adapted to exert pressure upon the face of said sprocket wheel. By utilizing a device of this character the sprocket-wheel is held by the friction resistance and therefore prevented from loose movement incidental to rotation of the adjacent parts of the clutch, which movement would tend to act upon the nut 12 and thereby displace the same from its set position.

I claim:

1. A variable speed gearing comprising a fixed axle, a drive-member having a clutch-face, and a driven-member, each being revolubly mounted about the axle, a threaded sleeve section revolubly mounted about said axle, a longitudinally shiftable nut engaging the sleeve threads, the nut having oppositely disposed clutch-faces, one of which is adapted to engage with the clutch-face of the drive-member when the nut is moved in one direction, a non-rotatory slidable block mounted about the axle for engagement with the other clutch-face of the nut when the latter is moved in the opposite direction from that aforesaid, a spring-locked clutch mechanism connecting the drive and driven members, means carried by the slidable block for effecting release of the spring-locked clutch mechanism incidental to engagement of the block with the aforesaid nut, an exteriorly toothed gear-wheel revolubly mounted about the axle, a clutch for the gear-wheel, means carried by said block for actuating the gear-wheel clutch, whereby said gear-wheel is held against rotation incidental to a further movement of the aforesaid block after the same has effected its releasing movement with relation to the spring-locked clutch mechanism, an internally toothed gear-wheel carried by the driven member, and a gear train carried by the drive member engageable with the internally and exteriorly toothed gear-wheels.

2. A variable speed gearing comprising a fixed axle, a drive member having a clutch face and a driven member each revolubly mounted about the axle, a threaded sleeve section revolubly mounted about said axle, a manually actuated sprocket-wheel secured thereto, a longitudinally shiftable nut having oppositely disposed friction clutch faces mounted upon the sleeve threads, one of which clutch-faces is adapted to engage the clutch-face of the drive member when the nut is moved in one direction, a non-rotatory slidable block mounted about the axle having a friction clutch face for engagement with the other friction clutch face of the nut when the latter is moved in the opposite direction from that aforesaid, a spring-locked friction clutch mechanism connecting the drive and driven members, releasing means for the spring-locked clutch mechanism carried by the slidable block incidental to movement of said block by the nut, an exteriorly toothed gear-wheel revolubly mounted about the axle, a friction clutch mechanism connecting the toothed gear-wheel and fixed axle, setting means carried by said block for the clutch mechanism between said toothed gear-wheel and axle incidental to a further movement of the aforesaid block after the same has effected its releasing movement of the spring-locked clutch mechanism, an internally toothed gear-wheel carried by the driven member, and a gear train carried by the drive member engageable with the internally and exteriorly toothed gear-wheels.

3. A variable speed gearing comprising a fixed axle, a drive-member having a clutch-face, and a driven-member, each revolubly mounted about the axle, a threaded sleeve section revolubly mounted about said axle, a longitudinally shiftable nut in threaded engagement with the sleeve, the nut having oppositely disposed clutch-faces, one of which is adapted to engage the clutch-face of the drive-member when the nut in moved in one direction, a non-rotatory slidable shell carried by the axle, an independently slidable block mounted upon the shell for engagement with the other clutch-face of the nut when the latter is moved in the opposite direction from that aforesaid, a longitudinally expansible spring interposed between one end of the shell and block, means carried by said shell or holding the spring under a predetermined compression, a spring-locked clutch mechanism connecting the drive and driven members, releasing means for the spring-locked clutch carried by the slidable block, an exteriorly toothed gear-wheel revolubly mounted about the axle, clutch mechanism connecting the gear-wheel and axle, means carried by the aforesaid block for setting the clutch mechanism between the toothed gear-wheel and axle, an internally toothed gear-wheel carried by the driven member, and a gear train carried by the drive member engageable with the internally and exteriorly toothed gear wheels.

4. A variable speed gearing comprising a fixed axle, a drive-member having a clutch-face, and a driven-member, each being revolubly mounted about the axle, a threaded sleeve section revolubly mounted about said axle, a longitudinally shiftable nut mounted upon the threaded sleeve, the nut having oppositely disposed friction faces, one of which is adapted to engage the friction face of the drive-member, a non-rotatory slidable shell carried by said axle having block retaining flanges extending therefrom, an independently slidable block mounted upon the shell between the block-retaining flanges, the block being provided with a friction-face adapted to engage the other friction-face of the nut, a longitudinally expansible spring interposed between one of the shell flanges and block, a spring-locked clutch mechanism and a spring released clutch mechanism connecting the drive and driven members, actuating mechanism for the spring-locked and spring-released clutch mechanisms carried by the slidable block, an exteriorly toothed gear-wheel revolubly mounted about the axle, clutch mechanism connecting the exteriorly toothed gear-wheel and axle adapted to be actuated by the aforesaid shell, an internally toothed gear-wheel carried by the driven member, and a gear train carried by the drive member engageable with the internally and exteriorly toothed gear wheels.

5. A variable speed gearing comprising a fixed axle, a drive member and a driven member revolubly mounted about the axle, the drive-member being provided with a clutch-face, a spring-locked clutch mechanism between the drive and driven members, a manually operative threaded sleeve, a shiftable clutch nut carried by the threaded sleeve for effecting locking engagement with the clutch face of the drive member when the sleeve is operated in one direction, a longitudinally movable shell supported by the axle, an exteriorly toothed gear-wheel rotatably mounted about the axle, a clutch mechanism connecting the exteriorly toothed gear-wheel and axle, actuating means for said clutch mechanism carried by the shell, a slidable block mounted upon said shell adapted to be engaged by the nut when the latter is moved by the sleeve in the opposite direction from that aforesaid, a spring interposed between the block and shell, a spring-released clutch mechanism between the drive and driven members, engaging means carried by the aforesaid block for the spring-locked and spring-released clutch mechanisms, an internally toothed gear-wheel carried by the driven member, and a gear train carried by the drive member engageable with the internally and exteriorly toothed gear-wheels.

6. A variable speed gearing comprising a fixed axle, a drive-member having a clutch-face and a driven-member, each being revolubly mounted about the axle, a threaded sleeve section revolubly mounted about said axle, a longitudinally shiftable nut mounted upon the sleeve threads having oppositely disposed clutch-faces, one of which is adapted to engage the clutch-face of the drive-member when said nut is moved in one direction, a non-rotatory slidable block mounted about the axle for engagement with the nut when the latter is moved in the opposite direction from that aforesaid, a spring-locked clutch mechanism connecting the drive and driven members, means carried by the slidable block for effecting release of the spring-locked clutch mechanism incidental to engagement of the block with the aforesaid nut, a drive-wheel revolubly mounted about the axle, a clutch mechanism connecting the drive-wheel and axle, actuating means for the clutch mechanism carried by said block whereby the drive-wheel is locked against rotation incidental to a further movement of the aforesaid block after the same has effected the release of the spring-locked clutch mechanism, an internally faced driven wheel carried by the driven member, and transmission wheels carried by the drive member engaging the drive-wheel and internally faced driven wheel.

7. A variable speed gearing comprising a fixed axle, a threaded sleeve section revolubly mounted upon said axle, a pulley-hub journaled upon the axle, a bearing-head journaled upon the sleeve having a friction-face, tie-bolts secured to the bearing-head and pulley-hub, a wheel-hub loosely mounted upon said bearing-head and pulley-hub, a nut having oppositely disposed friction faces mounted upon the threaded sleeve, one of which friction-faces is adapted to engage the friction-face of the bearing-head, a head secured to the axle, a flanged shell slidably mounted upon the head, a block slidably mounted upon the shell having a friction face with which the adjacent friction face of the nut is adapted to engage, a coiled spring interposed between one of the keeper flanges and shell, an exteriorly toothed gear-wheel rotatably mounted upon bearings carried by the pulley-hub and head, a face extending from the gear-wheel engageable with the shell, friction rings carried by said gear-wheel and axle respectively, an internally toothed ring carried by the wheel-hub, a pair of oppositely disposed pinions mounted upon corresponding tie-bolts in meshed engagement with the toothed ring, a second pair of oppositely disposed pinions mounted upon corresponding tie-bolts in meshed engagement with the first named pair of pinions and the exteriorly toothed gear-wheel, a longitudinally movable disk carried by the slidable block for engagement with the disk, sets of friction rings mounted upon the tie-bolts upon opposite sides of the disk aforesaid, sets of friction rings carried by the wheel-hub and interposed between the sets of friction rings carried by the tie-bolts, and coiled springs interposed between the disk and pulley-hub surrounding certain of the tie-bolts.

In testimony that I claim the foregoing I have hereunto set my hand at Milwaukee in the county of Milwaukee and State of Wisconsin in the presence of two witnesses.

WILLIAM S. HARLEY.

Witnesses:
MAY DOWNEY,
N. E. OLIPHANT.